(12) United States Patent
Frolund et al.

(10) Patent No.: US 6,434,555 B1
(45) Date of Patent: Aug. 13, 2002

(54) METHOD FOR TRANSACTION RECOVERY IN THREE-TIER APPLICATIONS

(75) Inventors: Svend Frolund, Mountain View, CA (US); Rachid Guerraoui, Montherod (CH)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/490,252

(22) Filed: Jan. 24, 2000

(51) Int. Cl.[7] .............................................. G06F 17/30
(52) U.S. Cl. ........................... 707/4; 707/10; 709/229
(58) Field of Search .............................. 707/10, 200, 201, 707/202, 203, 204, 205, 103, 101, 4, 2; 709/229

(56) References Cited

U.S. PATENT DOCUMENTS 6,085,198 A * 7/2000 Skinner et al. .............. 707/103
6,134,594 A * 10/2000 Helland et al. .............. 709/229
6,226,637 B1 * 5/2001 Carey et al. ..................... 707/4
6,266,666 B1 * 7/2001 Ireland et al. ................. 707/10
6,285,997 B1 * 9/2001 Carey et al. ..................... 707/4

* cited by examiner

Primary Examiner—Diane D. Mizrahi
(74) Attorney, Agent, or Firm—Thomas X. Li

(57) ABSTRACT

A three-tiered transaction processing system is provided in which state information maintained in the database tier is used to facilitate recovery of transaction coordinators without the transaction coordinators having to maintain their own recovery information and a method of accessing such state information while controlling the lifetime of this recovery information; i.e., keeping it around long enough so that client tier will have a consistent view of the world before the information is forgotten. This solves the problem of outcome determination.

12 Claims, 7 Drawing Sheets

METHOD FOR TRANSACTION RECOVERY IN THREE-TIER APPLICATIONS

TECHNICAL FIELD

The present invention relates generally to transaction processing systems and more particularly to an efficient method for transaction recovery in three-tier applications.

BACKGROUND ART

Commonly, human end-users are exposed to many different failures and error situations in systems which are called transaction processing systems (TPS). TPSs are three-tier (client-server-database) systems which allow client applications to perform database transactions. "Client" refers to an end-user mode of operation and level of access where requests are made for server processing or database information. As examples of database transactions, there are various reservations systems, such as for airlines, hotels and car rentals, and financial systems, such as banking, credit card, and automated teller machines. In these systems, a customer or sales representative uses a client application at the client level that allows a user to query and update a database. A client interface allows the client application to specify which database to add information to or to update. However, if a failure occurs in either the second tier application server or the third tier database, for example during an update, it is difficult for the client to know whether the update was actually performed or not.

As an example, for an Automated Teller Machine (ATM) failure, it is likely that the ATM customer would need to call the bank to find out whether the transaction was completed properly. This would generate more work for bank employees and create unsatisfied customers and would be very costly in terms of the lost business, reduced productivity, and unsatisfied customers.

Essentially, the client needs to query the database and see if the update has been performed and if it has not, to reissue the update. Even this solution is, however, not failure proof.

First, the system might not know what the values were before the update, and if the update is relative to the old value, the client might not be able to determine whether the initial update was performed or not. For example, if the ATM transaction involved a deposit to an account, the bank employee would have to have information regarding the previous balance and any other deposits and withdrawals that may have occurred to the account around the time of its failure.

Second, another client might have done an update after the first client's query and failed update. Therefore, the first client will not be able to determine with confidence whether the update was performed or not, requiring the first client would have to guess what to do.

Thus, involving the client in the recovery of a failed request should be avoided to the largest possible extent. Unfortunately, complex commercial database systems and transaction processing systems generally fail to provide client transparency, or the ability to detect and correct problems without human intervention. Rather, it is expected that the failure recovery either be handled by the client or be coded into applications.

Embedding the failure recovery into the application code complicates the application considerably and is error prone.

Implementing error recovery logic is difficult and complex. Client applications as well as application servers currently need to implement error recovery as part of the application specific code. Further, the error recovery logic is not necessarily reusable for any application adhering to the described architecture.

Traditional solutions have centered around devices called "transaction coordinators", which are responsible for coordinating and terminating transactions against one or more databases. The potential for failure in both the coordinator and the databases requires that some recovery information be maintained so that a consistent state can be maintained when recovering after failures. This is necessary so that transactions that were in the process of being terminated when a failure occurred can be completely terminated upon recovery. There are problems with these systems however.

First, traditional systems keep the recovery information in their local disk file on the same machine that runs the transaction coordinator. Maintaining this disk file has a performance cost due to the continual writing of entries to the disk file.

A second problem with maintaining recovery information in local disk files is in emerging three-tier applications. It is desirable for the transaction coordinators to recover as stateless in the middle tier, which means that entries should replicate freely and that it should be possible that a crash can occur on one node and recovery can occur on a different node. Having recovery information in local disk files so hampers that flexibility that the benefits of three-tier applications are lost.

Third, current transaction coordinators do not perform "outcome determination". "Outcome determination" is when the result of a transaction is needed to make a decision. The coordinators keep recovery information around long enough for consistent recovery by the application server, but the moment that a transaction has completely terminated, whether it's abort or commit, the information is deleted. In some cases this is too early because the client machines need to know the outcome in order to determine if they are retrying aborted transactions. Using the recovery information can save a system from duplicating its efforts.

The latter two problems have been major long-term obstacles to the wide spread adoption of three-tiered systems.

An answer has long been sought to solve the above problems, but it has also long eluded those skilled in the art.

DISCLOSURE OF THE INVENTION

The present invention provides a three-tiered transaction processing system in which state information maintained in the database tier is used to facilitate recovery of transaction coordinators without the transaction coordinators having to maintain their own recovery information and a method of accessing such state information.

The present invention further provides for a three-tiered transaction processing system in which state information maintained in the database tier is used to facilitate recovery of transaction coordinators without the transaction coordinators having to maintain their own recovery information and a method of accessing such state information while controlling the lifetime of this recovery information; i.e., keeping it around long enough so that client tier will have a consistent view of the world before the information is forgotten. This solves the problem of outcome determination.

The present invention further provides an extension of the XA interface, a standard used by database management systems to control transactions, to also include two additional methods that give access to the set of committed transactions in the database transaction log and the set of prepared transactions in the transaction log of the database management system. The present invention exploits the fact that the transaction log contains entries about committed and prepared transactions already. This solves the problem that the database management system forgets about those entries once transactions are committed.

The present invention further provides for a three-tiered transaction processing system that eliminates the performance cost associated with the writing of recovery information to the server.

The present invention further provides for a three-tiered transaction processing system with stateless recovery in the middle tier. If one server crashes, the recovery information is stored in the database and recovery can take place on a different server node.

BEST MODE FOR CARRYING OUT THE INVENTION

Figure 1:
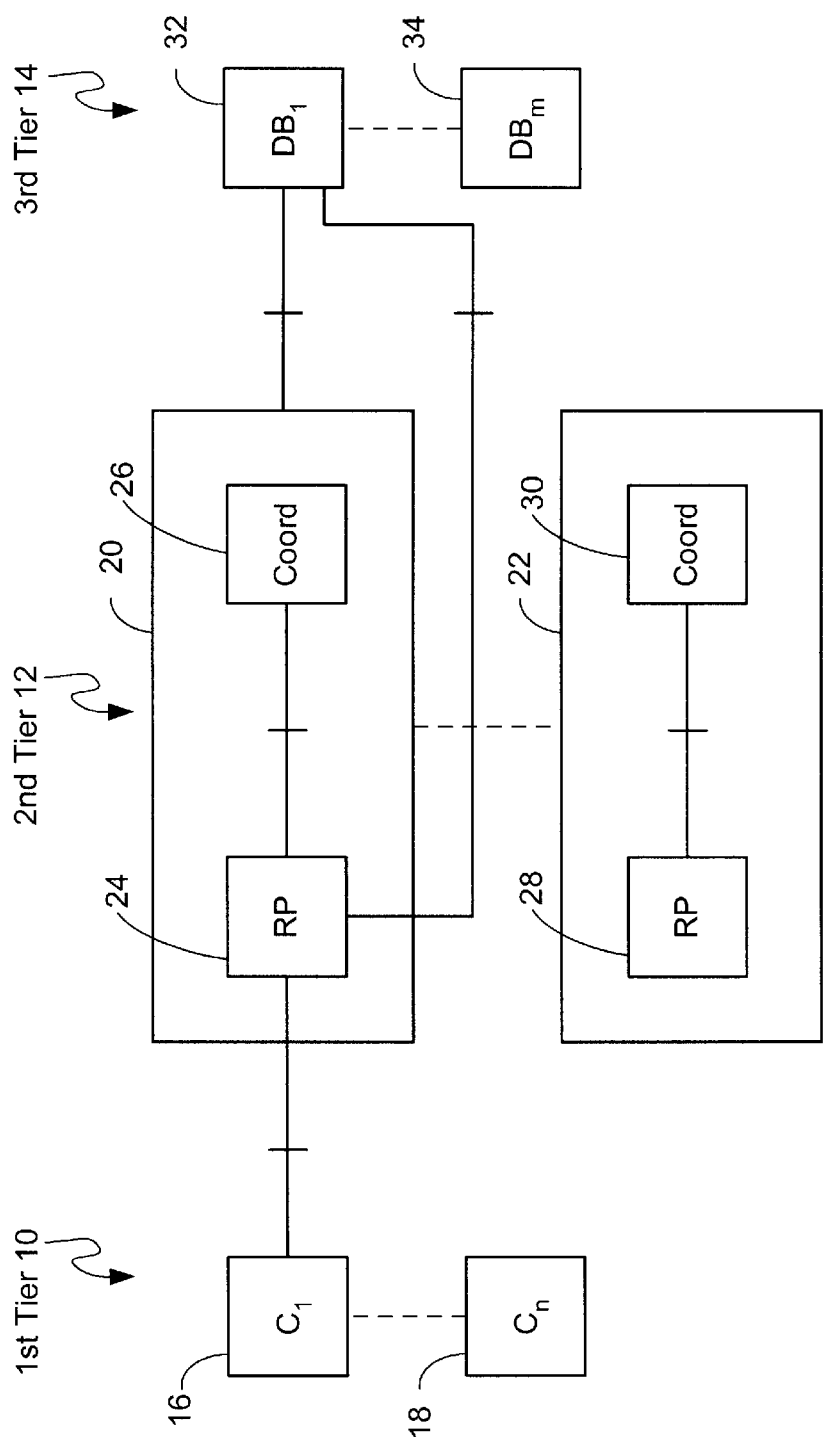
FIG. 1 shows the structure of a generic three-tier application.

Referring now to FIG. 1, therein is shown the structure of a generic three-tier application. It consists of a first tier 10, a second tier 12, and a third tier 14. The first tier 10 is composed of one or more client machines $C_1$ 16 through $C_n$ 18. The first tier client machines $C_1$, 16 through $C_n$ 18 submit requests to the second tier applications servers 12. The second tier 12 can be made up of any number of applications servers $S_1$ 20 and $S_2$ 22. The server $S_1$ 20 has two parts, an $S_1$ 22 request processor 24 and an $S_1$ transaction coordinator 26. The server $S_2$ 22 also has two parts, an $S_2$ request processor 28 and an $S_2$ transaction coordinator 30. The second tier application servers $S_1$ 20 and $S_2$ 22 perform transactions against one or more databases in the third tier 14. The third tier 14 is composed of one or more database machines $DB_1$ 32 through $DB_n$ 34.

Figure 2:
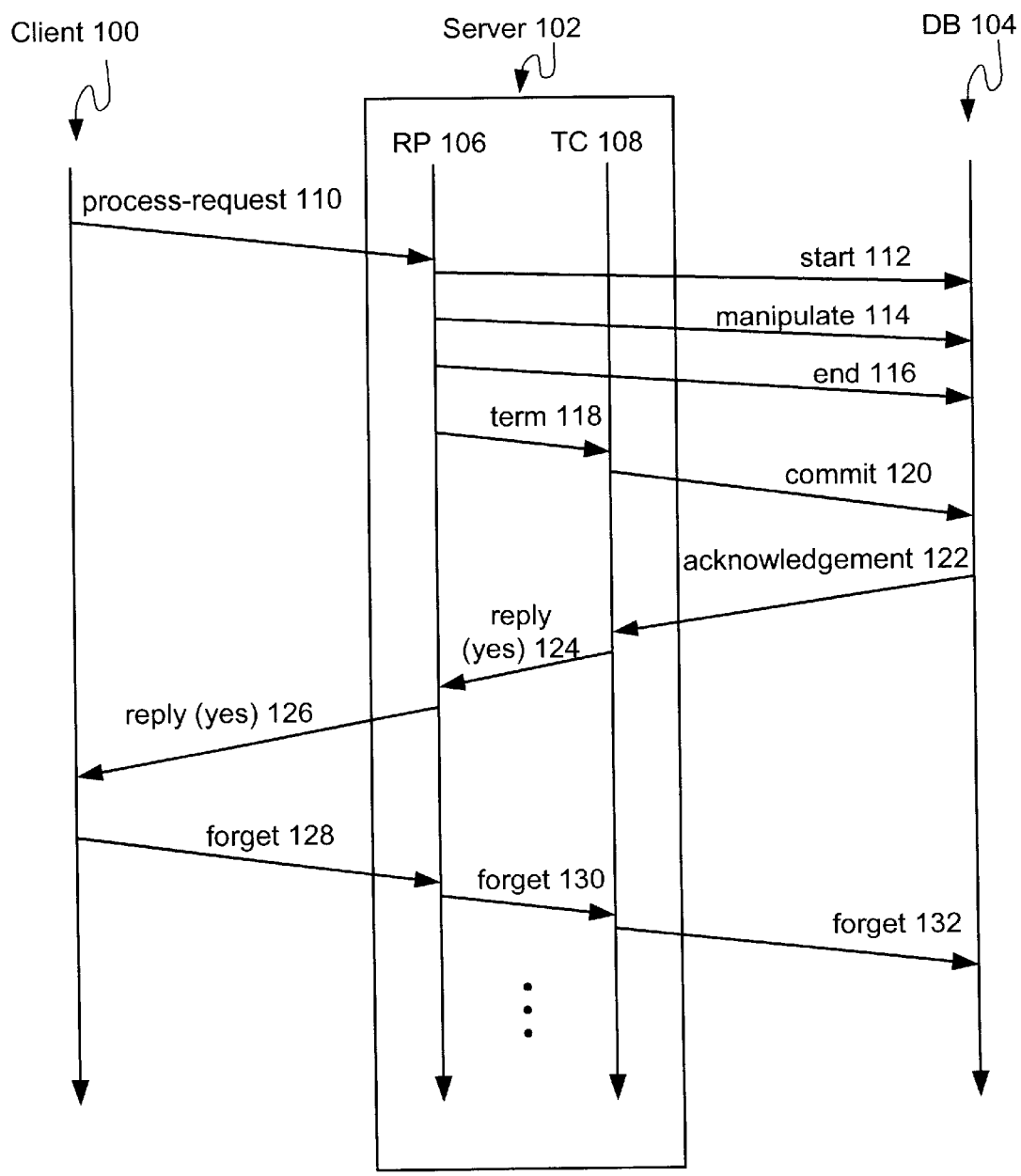
FIG. 2 is a timeline illustrating the operation of the invention in the case of a single failure-free database.

Referring now to FIG. 2, therein is shown a timeline illustrating the operation of the invention in the case of a single database system. The three tiers are represented by a single client machine 100, a single application server 102, and a single database 104. The application server 102 is composed of two parts, a request processor 106 and a transaction coordinator 108. The starting point of the transaction is the client 100 sending a process request message 110 to the application server 102. In response, the request processor 106 inside the application server 102 first issues a start operation 112 to the database 104, then performs some transient manipulation 114 to the database 104 and finally ends the transaction 116. At this point in time, the manipulation of information inside the database is complete but the changes have yet to take effect and are undoable.

In order commit or terminate the transaction, the request processor 106 sends a terminate message 118 to the transaction coordinator 108. In response, the transaction coordinator 108 inside of the application server 102 issues a commit message 120 to the database 104. The database 104 sends an acknowledgement 122 back to the transaction coordinator 108 upon completion of the commit 120. The transaction coordinator 108 then returns the status of the commit by sending an affirmative reply signal 124 to the request processor 106. In turn, the request processor 106 then returns the status of the commit by sending an affirmative reply signal 126 to the client 100.

Upon receipt of an affirmative reply signal 126, the client 100 is in a consistent state as the outcome of the transaction is now known. The client 100 then instructs the system to forget about the transaction by sending a forget signal 128 to the request processor 106. The request processor 106 sends out its own forget signal 130 to the transaction coordinator 108 which in turn sends a forget signal 132 to the database 104.

Figure 3:
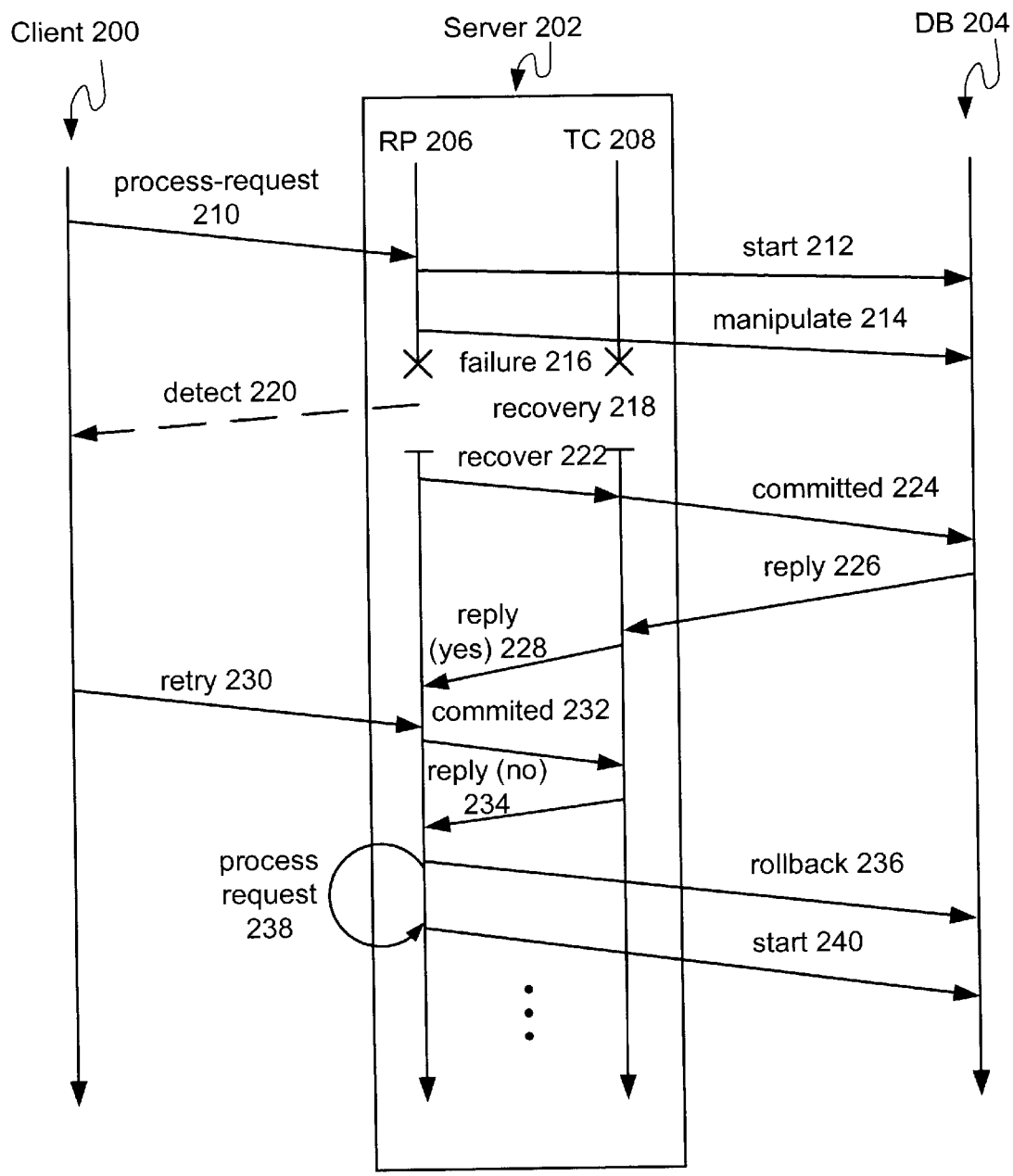
FIG. 3 is a timeline illustrating how the invention handles a server failure in the case of a single database system.

Referring now to FIG. 3, therein is shown a timeline illustrating how the invention handles server failures in the case of a single database system. The three tiers are represented by a single client machine 200, a single application server 202, and a single database 204. The application server 202 is composed of two parts, a request processor 206 and a transaction coordinator 208. The starting point of the transaction is the client 200 sending a process request message 210 to the application server 202. In response, the request processor 206 inside the application server 202 first issues a start operation 212 to the database 204 and hen performs some transient manipulation 214 to the database 204. However, before the can be committed as in FIG. 1, the application server 202 experiences a failure 216. The application server 202 goes through a recovery process 216 wherein the process is restarted. During the recovery period, the client 200 detects the server failure 220 through a time-out or similar mechanism. As the application server 202 restarts, the recover protocol begins as the request processor 206 sends the recover message 222 to the transaction coordinator 208. Because the transaction coordinator 208 has no state of its own, it needs to find out what the database 204 what was doing before the server failure 216. It therefore queries the database 204 by sending it a committed message 224 to obtain information about transactions that the client 200 may not know about, may not know the outcome of, or may be interested in retrying. A reply 226 sent back from the database 204 is made up of a list of transaction IDs that had been committed but not yet forgotten. In response to the reply 226, the transaction coordinator 208 creates a local data structure that contains information about the committed transactions and then sends a reply 228 to the request processor 206.

In the meantime the client 200 has detected the failure 216. The client 200 does not actually know if the transaction was committed or not, so it sends a retry message 230 to the request processor 206 which in response sends a committed message 232 to the transaction coordinator 208 to find out if the transaction was actually committed. The transaction coordinator 208 then takes the information that it got back from the database 204 in the reply 226 and checks to see if the pertinent transaction ID is part of the committed set. In this case the transaction ID is not part of the committed set because the application server 202 crashed before committing so the reply 234 sent back to the request processor 206 is negative. Because of the negative reply 234, the request processor 206 issues a rollback command 236 to undo the transient database changes and roll back the transaction that was in progress. The request processor 206 then simulates a client process request message by sending itself a process request message 238 and restarts the process with a start message 240 identical to the initial start message 212. The transaction then continues on as in the failure-free case shown in FIG. 2

Figure 4:
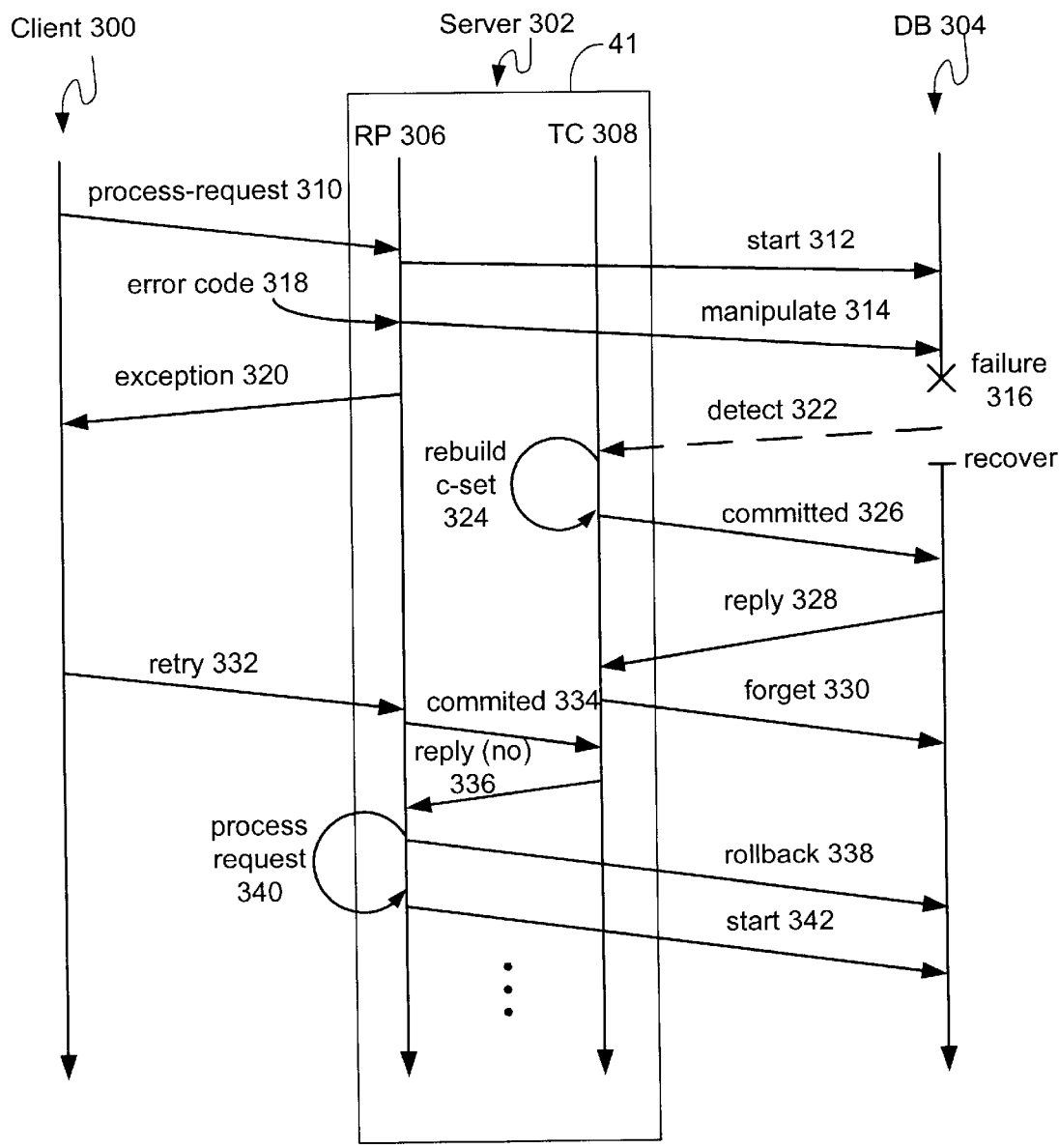
FIG. 4 is a timeline illustrating how the invention handles a database failure in the case of a single database system.

Referring now to FIG. 4, therein is shown a timeline illustrating how the invention handles a database failure in the case of a single database system. The three tiers are represented by a single client machine 300, a single application server 302, and a single database 304. The application server 302 is composed of two parts, a request processor 306 and a transaction coordinator 308. The starting point of the transaction is the client 300 sending a process request message 310 to the application server 302. In response, the request processor 306 inside the application server 302 first issues a start operation 312 to the database 304 and then performs some transient manipulation 314 to the database 304. Before the database transient manipulation 314 has been completed however, the database 304 experiences a failure 316 and crashes and the manipulate call returns an error code 318 to the request processor 306. The request processor 306 then sends an exception 320 to the client machine 300 letting it know that a problem of some type has occurred. The application server 302 then detects the database failure 322 and calls a rebuild c-set (committed set) method 324 after the database 304 recovers in order to reestablish its view of which transactions had been committed before the crash occurred. The transaction coordinator 308 then sends a committed query 326 to the database 304 to get the list of committed transactions. In response, the database returns the set of committed transactions in its reply 328. In comparing the lists of committed transactions from the transaction coordinator 308 and the database 304, differences may appear due to the database failure 316. As a result, the database 304 committed list must be updated and expired messages removed so a forget message 330 is sent from the transaction coordinator 308 to the database 304.

In the meantime the client machine 300 upon receiving the exception 320 retries the original process request 310 by sending a retry signal 332 to the request processor 306 of the application server 302. The request processor 306 then checks with the transaction coordinator 308 to see whether the transaction has already been committed and, not finding it committed due to the database failure 316, is sent back a negative reply 336. In response, the request processor 306 issues a rollback command 338 to undo the transient database changes and roll back the transaction that was previously in progress. The request processor 306 then simulates a client process request message by sending itself a process request message 340 and restarts the process with a start message 342 identical to the initial start message 312. The transaction then continues on as in the failure-free case shown in FIG. 2.

Figure 5:
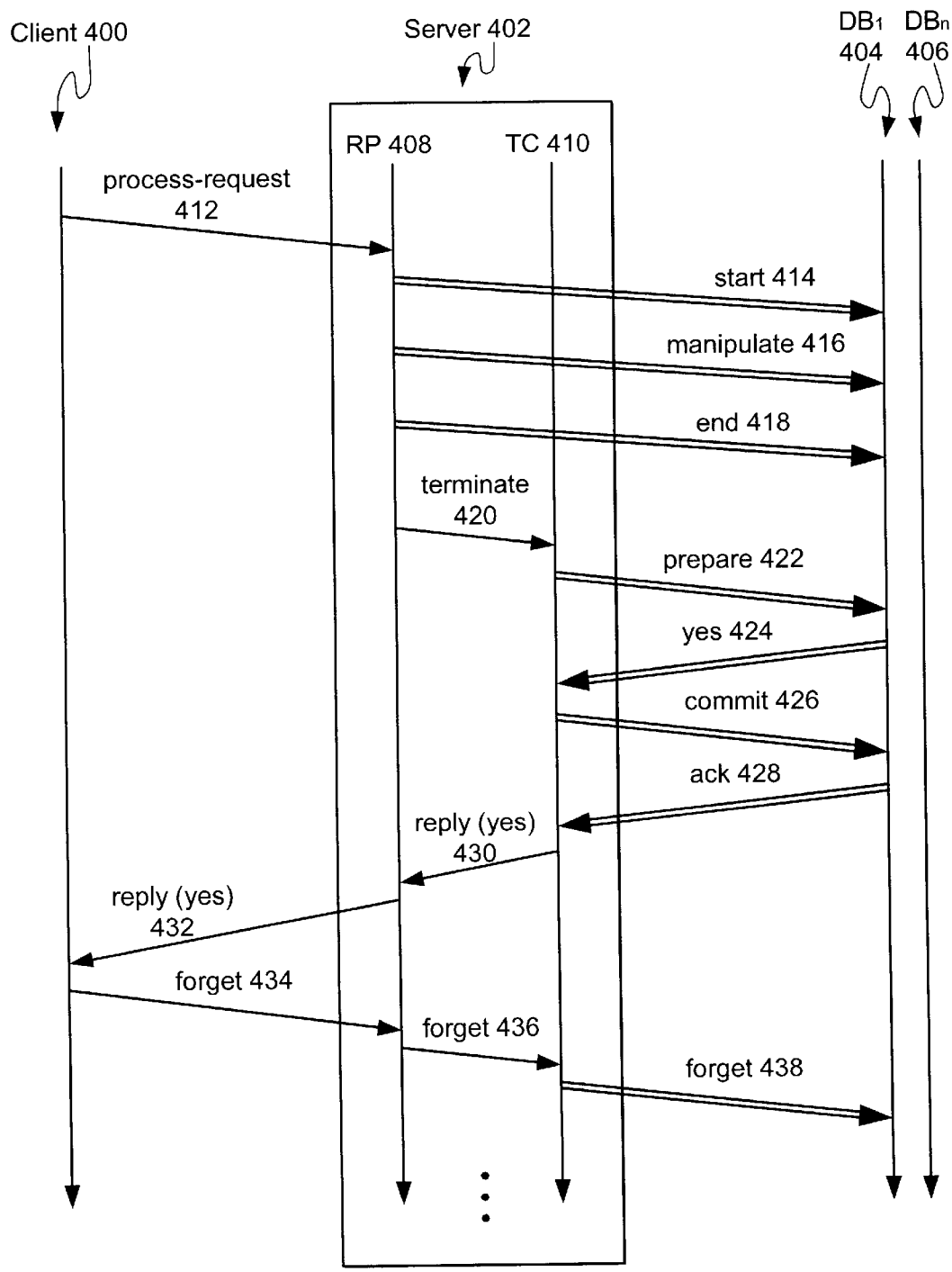
FIG. 5 is a timeline illustrating a failure-free execution of the invention in the case of a multiple database system.

Referring now to FIG. 5, therein is shown a timeline illustrating a failure-free execution of the invention in the case of multiple databases. The three tiers are represented by a single client machine 400, a single application server 402, and one or more databases $DB_1$ 404 through $DB_n$ 406. The application server 402 is composed of two parts, a request processor 408 and transaction coordinator 410. The starting point of the transaction is the client 400 sending a process request message 412 to the application server 402. In response, the request processor 408 inside the application server 402 issues multiple start operations 414 to the databases $DB_1$ 404 through $DB_n$ 406, then manipulates 416 the databases $DB_1$ 404 through $DB_n$ 406, and finally terminates the transaction with the databases $DB_1$ 404 through $DB_n$ 406 with an end message 418.

In order to make the changes permanent in the databases, a two-phase commit protocol is initiated with a terminate message 420 from the request processor 408 to the transaction coordinator 410. A prepare message 422 is then sent to all of the databases $DB_1$ 404 through $DB_n$ 406 requesting a vote on whether the databases can all commit to the changes occurring in the transaction. In this failure-free case, all votes come back in affirmative vote messages 424 causing the transaction coordinator 410 to send a commit message 426 to all of the databases $DB_1$ 404 through $DB_n$ 406. When all the databases $DB_1$ 404 through $DB_n$ 406 have replied with acknowledgement messages 428 representing their reception and processing of the commit messages 426, the transaction coordinator 410 returns an affirmative reply 430 to the request processor 408. The request processor 408 informs the client 400 that the transaction was completed successfully with an affirmative reply 432, and the client 400, as in the single database case in FIG. 2, initiates a forget process with a forget message to the request processor 408. The request processor 408 signals the transaction coordinator 410 with a forget message 436, and transaction coordinator 410 notifies the databases $DB_1$ 404 through $DB_n$ 406 with forget messages 438.

Figure 6:
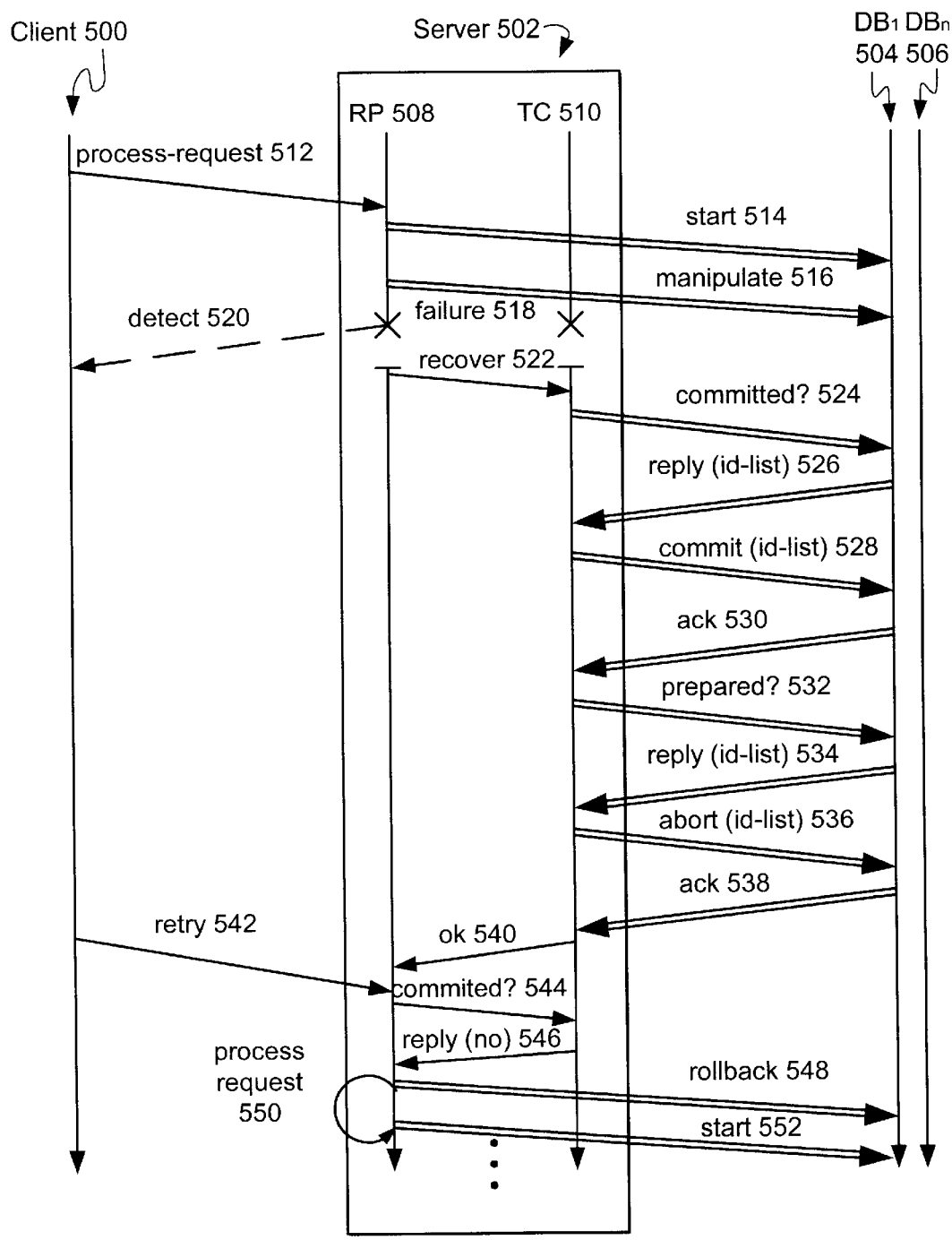
FIG. 6 is a timeline illustrating how the invention handles a server failure in the case of a multiple database system.

Referring now to FIG. 6, therein is shown a timeline illustrating how the invention handles server failures in the case of a multiple database system. The three tiers are represented by a single client machine 500, a single application server 502, and one or more databases $DB_1$ 504 through $DB_n$ 506. The application server 502 is composed of two parts, a request processor 508 and transaction coordinator 510. The starting point of the transaction is the client 500 sending a process request message 512 to the application server 502. In response, the request processor 510 inside the application server 502 issues multiple start operations 514 to the databases $DB_1$ 504 through $DB_n$ 506, then manipulates 516 the databases $DB_1$ 504 through $DB_n$ 506. However, before the transaction can be committed as in FIG. 5, the application server 502 experiences a failure 518.

The application server 502 goes through a recovery period wherein the process is restarted. During the recovery period, the client 500 detects the server failure 520 through a time-out or similar mechanism. As the application server 502 restarts, the recover protocol begins as the request processor 508 sends the recover message 522 to the transaction coordinator 510. Because the transaction coordinator 510 has no state of its own, it needs to find out what the database what was doing before the server failure. It therefore queries the databases $DB_1$ 504 through $DB_n$ 506 by sending them committed queries 524 to obtain information about transactions that the client 500 may not know about, may not know the outcome of, or may be interested in retrying. The replies 526 sent back from the databases $DB_1$ 504 through $DB_n$ 506 make up a committed set of transaction IDs that have been committed but not yet forgotten. With the information from the replies 526, the transaction coordinator 510 reconstructs the state of the application 502 before the server failure 518 and for each transaction listed, sends a commit message 528 to the databases $DB_1$ 504 through $DB_n$ 506. The databases $DB_1$ 504 through $DB_n$ 506 send back affirmative acknowledgements 530 to the transaction coordinator 510 when all the transactions in the committed set are committed.

In order to fully recover, the transaction coordinator 510 next constructs a set of transactions that were in a prepared but not yet committed state before the server failure 518 occurred by sending a prepared message 532 to all of the databases $DB_1$ 504 through $DB_n$ 506 and getting a list of prepared transaction ID's back in a reply 534. It aborts those transactions with abort messages 536 to the databases $DB_1$ 504 through $DB_n$ 506 and waits for affirmative acknowledgements 538 to confirm the abortions. After receiving the acknowledgements 538, the transaction coordinator 510 knows that all the transactions that were in progress before the crash have now been consistently terminated either by committing or terminating them and can send back an okay signal 540 to the request processor 508.

In the meantime the client 500 has detected the server failure 518. The client 500 does not actually know if the transaction was committed or not, so it sends a retry message 542 to the request processor 508 which in response, sends a committed message 544 to the transaction coordinator 510 to find out if the transaction was actually committed. Because the current transaction was not committed due to the server failure 518, the transaction coordinator 510 returns a negative reply 546 to the request processor 508 causing the request processor 508 to issue a rollback command 548 to undo the transient database changes and roll back the transaction that was in progress. The request processor 508 then simulates a client process request message by sending itself a process request message 550 and restarts the process with a start message 552 identical to the initial start message 514. The transaction then continues on as in the failure-free case shown in FIG. 5.

Figure 7:
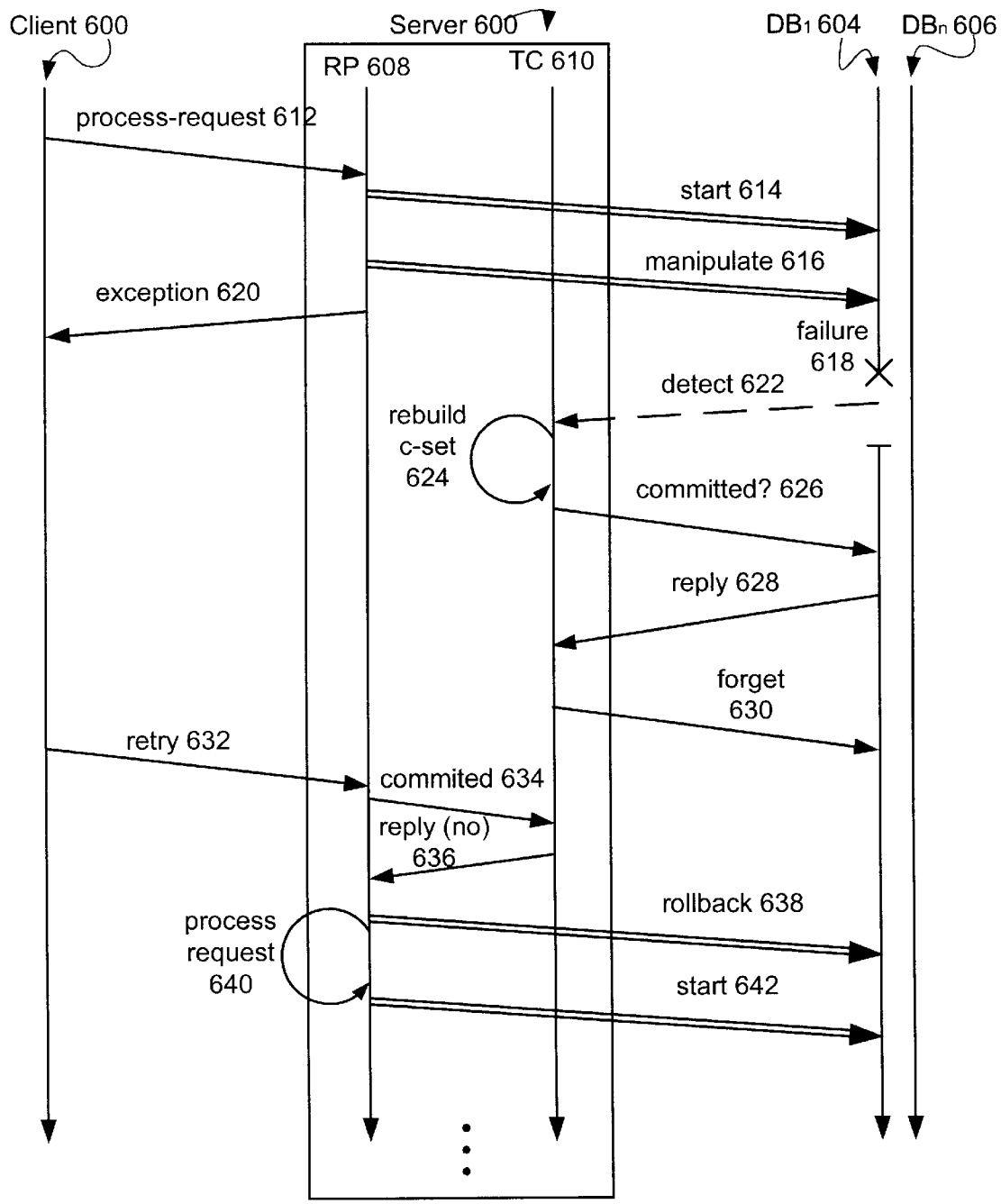
FIG. 7 is a timeline illustrating how the invention handles a database failure in the case of a multiple database system.

Referring now to FIG. 7, therein is shown a timeline illustrating how the invention handles a database failure in the case of a multiple database system. The three tiers are represented by a single client machine 600, a single application server 602, and one or more databases $DB_1$ 604 through $DB_n$ 606. The application server 602 is composed of two parts, a request processor 608 and transaction coordinator 610. The starting point of the transaction is the client 600 sending a process request message 612 to the application server 602. In response, the request processor 610 inside the application server 602 issues multiple start operations 614 to the databases $DB_1$ 604 through $DB_n$ 606, then manipulates 616 the databases $DB_1$ 604 through $DB_n$ 606. However, before the transaction can be committed as in FIG. 5, the database $DB_n$ 604 experiences a failure 618.

As a result, the manipulation 616 by the request processor 608 returns an exception 620 that is passed on to the client 600. The transaction coordinator 610 also detects 622 the database failure 618 and begins the recovery process by sending itself the rebuild c-set command 624. In order to rebuild the c-set, the transaction coordinator 610 sends a committed query 626 to the databases $DB_1$ 604 through $DB_n$ 606. In return, the databases $DB_1$ 604 through $DB_n$ 606 reply 628 with information to compile a list of committed transactions. To be safe, the transaction coordinator 610 sends forget messages 630 to the databases $DB_1$ 604 through $DB_n$ 606 to confirm that all the expired transactions in the committed transaction list are forgotten.

Meanwhile, the client 600 that earlier received the exception 620 issues a retry command 632 to the request processor 608. The request processor 608 does not know if the transaction was committed or not, so it sends a committed message 634 to the transaction coordinator 610 to find out. Because the current transaction was not committed due to the database failure 618, the transaction coordinator 610 returns a negative reply 636 to the request processor 608 causing the request processor 608 to issue a rollback command 638 to undo the transient database changes and roll back the transaction that was in progress. The request processor 608 then simulates a client process request message by sending itself a process request message 640 and restarts the process with a start message 642 identical to the initial start message 614. The transaction then continues on as in the failure-free case shown in FIG. 5.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A method of transaction processing in a three-tier transaction processing system having a client tier, an application server tier including a request processor and a transaction coordinator, and a database tier, comprising the steps of:

providing an interface among the client tier, the application server, and the database tier;

receiving a request from the client tier by the request processor that a transaction be processed;

manipulating data in the database tier by the request processor;

receiving a terminate command by the transaction coordinator from the request processor;

sending a commit command to commit the transaction to the database tier from the transaction coordinator;

recording the commit of the transaction in the database tier;

providing an acknowledgement that the transaction has been committed to the transaction coordinator by the database tier;

providing a reply to the client tier from the application server acknowledging the completion of the transaction termination process; and sending a forget command from the client tier.

2. The method of transaction processing in a three-tier transaction processing system as claimed in claim 1 including the steps of:

detecting an application server failure;

sending a recover command from the request processor to the transaction coordinator after an application server failure;

receiving a committed query by the database tier from the transaction coordinator;

providing a reply composed of committed transaction identifications by the database tier to the transaction coordinator;

providing a reply about committed transactions from the transaction coordinator to the request processor;

detecting the application server failure by the client tier;

providing a retry message to the request processor from the client tier;

sending a committed query from the request processor to the transaction coordinator;

providing a reply from the transaction coordinator to the request processor;

receiving a rollback command by the database tier from the request processor based on the reply from the transaction coordinator;

sending a process request in a loop from the request processor to the request processor; and providing a start command from the request processor to the database tier.

3. The method of transaction processing in a three-tier transaction processing system as claimed in claim 1 including the steps of:

detecting a failure in the database tier by the transaction coordinator;

running a rebuild by the transaction coordinator on itself;

sending a committed query from the transaction coordinator to the database tier;

replying to the committed query with a list of committed transactions from the database tier to the transaction coordinator;

receiving a forget command from the transaction coordinator by the database tier;

receiving an error code from a failed database tier by the request processor;

sending an exception from the request processor to the client tier;

issuing a retry command from the client tier to the request processor;

providing a committed query to the transaction coordinator from the request processor;

providing a reply with a response from the transaction coordinator to the request processor;

sending a rollback command from the request processor to the database tier based on the reply from the transaction coordinator;

sending a process request in a loop from the request processor to the request processor; and providing a start command from the request processor to the database tier.

4. A method of transaction processing in a three-tier transaction processing system having a client tier, an application server tier, and a database tier having a plurality of databases, comprising the steps of:

receiving a request from the client tier by the request processor that a transaction be processed;

manipulating data in the plurality of databases in the database tier by the request processor;

receiving a terminate command by the transaction coordinator from the request processor;

commanding the transaction to be prepared by the plurality of databases in the database tier from the application server;

recording the transaction being prepared by the plurality of databases;

providing an acknowledgement to the application server by the plurality of databases in the database tier that the transaction has been prepared;

commanding the transaction to be committed by the plurality of databases in the database tier from the application server;

providing an acknowledgement to the transaction coordinator by the plurality of databases in the database tier that the transaction has been committed;

sending a reply to the request processor from the transaction coordinator acknowledging the completion of the transaction;

providing a reply to the client tier from the request processor acknowledging the completion of the transaction; and sending a forget command from the client tier.

5. The method of transaction processing in a three-tier transaction processing system as claimed in claim 4 including the steps of:

sending a recover command from the request processor to the transaction coordinator after an application server failure;

receiving a committed query by the plurality of databases in the database tier from the transaction coordinator;

providing a reply composed of committed transaction identifications by the plurality of databases in the database tier to the transaction coordinator;

sending a commit command to the plurality of databases in the database tier from the transaction coordinator;

receiving an acknowledgment from the plurality of databases in the database tier by the transaction coordinator that the commit command has been carried out;

sending a prepared query to the plurality of databases in the database tier from the transaction coordinator;

providing a reply from the plurality of databases in the database tier to the transaction coordinator listing the transaction identifications of prepared but not committed transactions;

sending a list of transactions to abort to the plurality of databases in the database tier from the transaction coordinator;

providing an acknowledgement from the plurality of databases in the database tier that the abort command has been carried out;

providing a reply to the request processor from the transaction coordinator acknowledging the completion of the recover command;

detecting an application server failure by the client tier;

providing a retry message to the request processor from the client tier;

sending a committed query from the request processor to the transaction coordinator;

providing a reply from the transaction coordinator to the request processor;

receiving a rollback command by the plurality of databases in the database tier from the request processor based on the reply from the transaction coordinator;

sending a process request in a loop from the request processor to the request processor; and providing a start command from the request processor to the plurality of databases in the database tier.

6. The method of transaction processing in a three-tier transaction processing system as claimed in claim 4 including the steps of:

detecting a failure in one of the plurality of databases in the database tier by the transaction coordinator;

running a rebuild c-set method by the transaction coordinator on itself;

sending committed queries from the transaction coordinator to the plurality of databases in the database tier;

replying to the committed queries with a list of committed transactions from the plurality of databases in the database tier to the transaction coordinator;

receiving a forget command from the transaction coordinator to the plurality of databases in the database tier;

receiving an error code from a failed database tier to the request processor;

sending an exception from the request processor to the client tier;

issuing a retry command from the client tier to the request processor;

providing a committed query to the transaction coordinator from the request processor;

providing a reply from the transaction coordinator to the request processor;

sending a rollback command from the request processor to the database tier based on the reply from the transaction coordinator;

sending a process request in a loop from the request processor to the request processor; and providing a start command from the request processor to the plurality of databases in the database tier.

7. A method of transaction recovery from a failure in a three-tier transaction processing system having a client machine, an application server including a request processor and a transaction coordinator, and a database machine using a database recovery log, comprising the steps of:

providing an interface between the client machine, the application server, and the database machine with the database recovery log;

receiving a request from the client machine by the request processor that a transaction be processed;

starting data manipulation of the database machine by the request processor;

manipulating data in the database machine by the request processor;

ending data manipulation in the database machine by the request processor;

receiving a terminate command by the transaction coordinator from the request processor;

sending a commit command to commit the transaction to the database machine from the transaction coordinator;

logging the commit of the transaction in the database recovery log;

providing an acknowledgement that the transaction has been committed to the transaction coordinator by the database machine;

providing a reply to the client machine from the application server acknowledging the completion of the transaction termination process;

receiving a forget command by the request processor from the client machine;

receiving a forget command by the transaction coordinator from the request processor; and receiving a forget command by the database machine from the transaction coordinator.

8. The method of transaction recovery from a failure in a three-tier transaction processing system as claimed in claim 7 including the steps of:

sending a recover command from the request processor to the transaction coordinator after an application server failure;

receiving a committed query by the database machine from the transaction coordinator;

providing a reply composed of committed transaction identifications by the database machine to the transaction coordinator;

providing a reply about committed transactions from the transaction coordinator to the request processor;

detecting an application server failure by the client machine;

providing a retry message to the request processor from the client machine;

sending a committed query from the request processor to the transaction coordinator;

providing a reply with a positive or negative response from the transaction coordinator to the request processor;

receiving a rollback command by the database machine from the request processor given a negative response from the transaction coordinator;

sending a process request in a loop from the request processor to the request processor; and providing a start command from the request processor to the database machine.

9. The method of transaction recovery from a failure in a three-tier transaction processing system as claimed in claim 7 including the steps of:

detecting a failure in the database machine by the transaction coordinator;

running a rebuild c-set method by the transaction coordinator on itself;

sending a committed query from the transaction coordinator to the database machine;

replying to the committed query with a list of committed transactions from the database machine to the transaction coordinator;

receiving a forget command from the transaction coordinator by the database machine;

receiving an error code from a failed database machine by the request processor;

sending an exception from the request processor to the client machine;

issuing a retry command from the client machine to the request processor;

providing a committed query to the transaction coordinator from the request processor;

providing a reply with a positive or negative response from the transaction coordinator to the request processor;

sending a rollback command from the request processor to the database machine given a negative response from the transaction coordinator;

sending a process request in a loop from the request processor to the request processor; and providing a start command from the request processor to the database machine.

10. A method of transaction recovery from a failure in a three-tier transaction processing system having a client machine, an application server, and a plurality of database machines using database recovery logs, comprising the steps of:

receiving a request from the client machine by the request processor that a transaction be processed;

starting data manipulation of the plurality of database machines by the request processor;

manipulating data in the plurality of database machines by the request processor;

ending data manipulation in the plurality of database machines by the request processor;

receiving a terminate command by the transaction coordinator from the request processor;

commanding the transaction to be prepared by the plurality of database machines from the application server;

logging the transaction being prepared by the plurality of databases using the database recovery logs;

providing an acknowledgement to the application server by the plurality of database machines that the transaction has been prepared;

commanding the transaction to be committed by the plurality of database machines from the application server;

logging the commit of the transaction in the database recovery logs;

providing an acknowledgement to the transaction coordinator by the plurality of database machines that the transaction has been committed;

sending a reply to the request processor from the transaction coordinator acknowledging the completion of the transaction;

providing a reply to the client machine from the request processor acknowledging the completion of the transaction;

receiving of a forget command by the request processor from the client machine;

receiving of a forget command by the transaction coordinator from the request processor;

receiving of a forget command by the database machine from the transaction coordinator.

11. The method of transaction recovery from a failure in a three-tier transaction processing system as claimed in claim 10 including the steps of:

sending a recover command from the request processor to the transaction coordinator after an application server failure;

receiving a committed query by the plurality of database machines from the transaction coordinator;

providing a reply composed of committed transaction identifications by the plurality of database machines to the transaction coordinator;

sending a commit command to the plurality of database machines from the transaction coordinator;

receiving an acknowledgment from the plurality of database machines by the transaction coordinator that the commit command has been carried out;

sending a prepared query to the plurality of database machines from the transaction coordinator;

providing a reply from the plurality of database machines to the transaction coordinator listing the transaction identifications of prepared but not committed transactions;

sending a list of transactions to abort to the plurality of database machines from the transaction coordinator;

providing an acknowledgement from the plurality of database machines that the abort command has been carried out;

providing a reply to the request processor from the transaction coordinator acknowledging the completion of the recover command;

detecting an application server failure by the client machine;

providing a retry message to the request processor from the client machine;

sending a committed query from the request processor to the transaction coordinator;

providing a reply with a positive or negative response from the transaction coordinator to the request processor;

receiving a rollback command by the plurality of database machines from the request processor given a negative response from the transaction coordinator;

sending a process request in a loop from the request processor to the request processor; and providing a start command from the request processor to the plurality of database machines.

12. The method of transaction recovery from a failure in a three-tier transaction processing system as claimed in claim 10 including the steps of:

detecting a failure in one of the plurality of database machines by the transaction coordinator;

running a rebuild c-set method by the transaction coordinator on itself;

sending committed queries from the transaction coordinator to the plurality of database machines;

replying to the committed queries with a list of committed transactions from the plurality of database machines to the transaction coordinator;

receiving a forget command from the transaction coordinator to the plurality of database machines;

receiving an error code from a failed database machine to the request processor;

sending an exception from the request processor to the client machine;

issuing a retry command from the client machine to the request processor;

providing a committed query to the transaction coordinator from the request processor;

providing a reply with a positive or negative response from the transaction coordinator to the request processor;

sending a rollback command from the request processor to the database machine given a negative response from the request processor;

sending a process request in a loop from the request processor to the request processor; and providing a start command from the request processor to the plurality of database machines.

* * * * *